US008127744B2

(12) United States Patent
Genslak et al.

(10) Patent No.: US 8,127,744 B2
(45) Date of Patent: Mar. 6, 2012

(54) COLD START ENGINE CONTROL DIAGNOSTIC SYSTEMS AND METHODS

(75) Inventors: Robert J. Genslak, Macomb, MI (US); Edward Stuteville, Linden, MI (US); Wenbo Wang, Novi, MI (US); Wesley W. Wald, Linden, MI (US)

(73) Assignee: GM Global Technology Operations LLC

( * ) Notice: Subject to any disclaimer, the term of this patent is extended or adjusted under 35 U.S.C. 154(b) by 665 days.

(21) Appl. No.: 12/353,636

(22) Filed: Jan. 14, 2009

(65) Prior Publication Data

US 2010/0175664 A1    Jul. 15, 2010

(51) Int. Cl.
*F02P 5/04*    (2006.01)
*F02P 5/15*    (2006.01)
(52) U.S. Cl. .............. 123/406.23; 123/406.24; 701/113
(58) Field of Classification Search ............ 123/406.23, 123/406.24, 406.2, 406.35, 406.53, 339.11, 123/491; 701/113
See application file for complete search history.

(56) References Cited

U.S. PATENT DOCUMENTS

| 7,203,617 | B1* | 4/2007 | Rahman et al. ............... 702/130 |
| 7,523,738 | B2* | 4/2009 | Ruiz ......................... 123/406.23 |
| 7,950,368 | B2* | 5/2011 | Pursifull et al. ......... 123/406.53 |
| 2008/0195297 | A1 | 8/2008 | Wang et al. |

FOREIGN PATENT DOCUMENTS

JP    2001-132526 A    4/2001

* cited by examiner

*Primary Examiner* — Hieu T Vo

(57) ABSTRACT

An engine control module includes a spark control module, an engine speed module, a residual determination module, and a metric determination module. The spark control module actuates spark plugs based on a commanded spark timing. The engine speed module determines a desired engine speed based on an engine temperature and a period of time an engine is in operation after a cold start. The residual determination module determines a desired spark timing based on the desired engine speed, and determines a residual spark timing based on a difference between the commanded spark timing and the desired spark timing. The metric determination module detects a spark timing fault based on the residual spark timing and a predetermined spark timing range.

20 Claims, 3 Drawing Sheets

COLD START ENGINE CONTROL DIAGNOSTIC SYSTEMS AND METHODS

FIELD

The present invention relates to control systems for engine cold starts, and more particularly to systems and methods for diagnosing engine speed and spark timing during cold starts.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When an internal combustion engine is initially started, the engine and an exhaust system of the engine are cold. The low temperature makes it difficult for fuel to vaporize in the cylinders. Incompletely vaporized fuel is not completely combusted. A portion of fuel that is not completely combusted at start-up increases hydrocarbon (HC) and carbon monoxide (CO) levels in the exhaust.

Vehicles that include the internal combustion engine may also include a catalytic converter to treat the exhaust. The catalytic converter includes a catalyst that catalyzes the oxidation of HC and CO as well as the reduction of nitrogen oxides in the exhaust. The catalyst does not efficiently control emissions at start-up because: 1) a higher fraction of fuel remains unburned and is subsequently exhausted, and 2) the catalyst is not sufficiently hot.

The catalyst operates efficiently when it reaches an operating temperature referred to as a light-off temperature. The catalyst reaches the light-off temperature after the engine and the exhaust system have been adequately heated from engine operation. During a cold start, engine speed is elevated and spark timing is retarded to increase exhaust temperature and exhaust flow to quickly heat the catalyst.

An engine control module implements on-board diagnostics (OBD) to ensure compliance with emission limits during a cold start. OBD may monitor the engine and exhaust system components that may increase emissions in the event of a malfunction. For example, OBD may monitor performance of the catalytic converter based on oxygen sensor signals. If a malfunction occurs, the OBD may set a diagnostic trouble code (DTC) to identify the malfunction so that the malfunction may be remedied. OBD may also notify a driver of the malfunction by displaying an indicator light.

SUMMARY

An engine control module comprises a spark control module, an engine speed module, a residual determination module, and a metric determination module. The spark control module actuates spark plugs based on a commanded spark timing. The engine speed module determines a desired engine speed based on an engine temperature and a period of time an engine is in operation after a cold start. The residual determination module determines a desired spark timing based on the desired engine speed, and determines a residual spark timing based on a difference between the commanded spark timing and the desired spark timing. The metric determination module detects a spark timing fault based on the residual spark timing and a predetermined spark timing range.

The residual determination module determines a residual engine speed based on a difference between a measured engine speed and the desired engine speed. The metric determination module detects an engine speed fault based on the residual engine speed and a predetermined engine speed range.

An engine control method comprises actuating spark plugs based on a commanded spark timing and determining a desired engine speed based on an engine temperature and a period of time an engine is in operation after a cold start. Additionally, the method comprises determining a desired spark timing based on the desired engine speed and determining a residual spark timing based on a difference between the commanded spark timing and the desired spark timing. The method further comprises detecting a spark timing fault based on the residual spark timing and a predetermined spark timing range.

The engine control method further comprises determining a residual engine speed based on a difference between a measured engine speed and the desired engine speed. Additionally, the method comprises detecting an engine speed fault based on the residual engine speed and a predetermined engine speed range.

BRIEF DESCRIPTION OF THE DRAWINGS

The drawings described herein are for illustration purposes only and are not intended to limit the scope of the present disclosure in any way.

DETAILED DESCRIPTION

Figure 1:
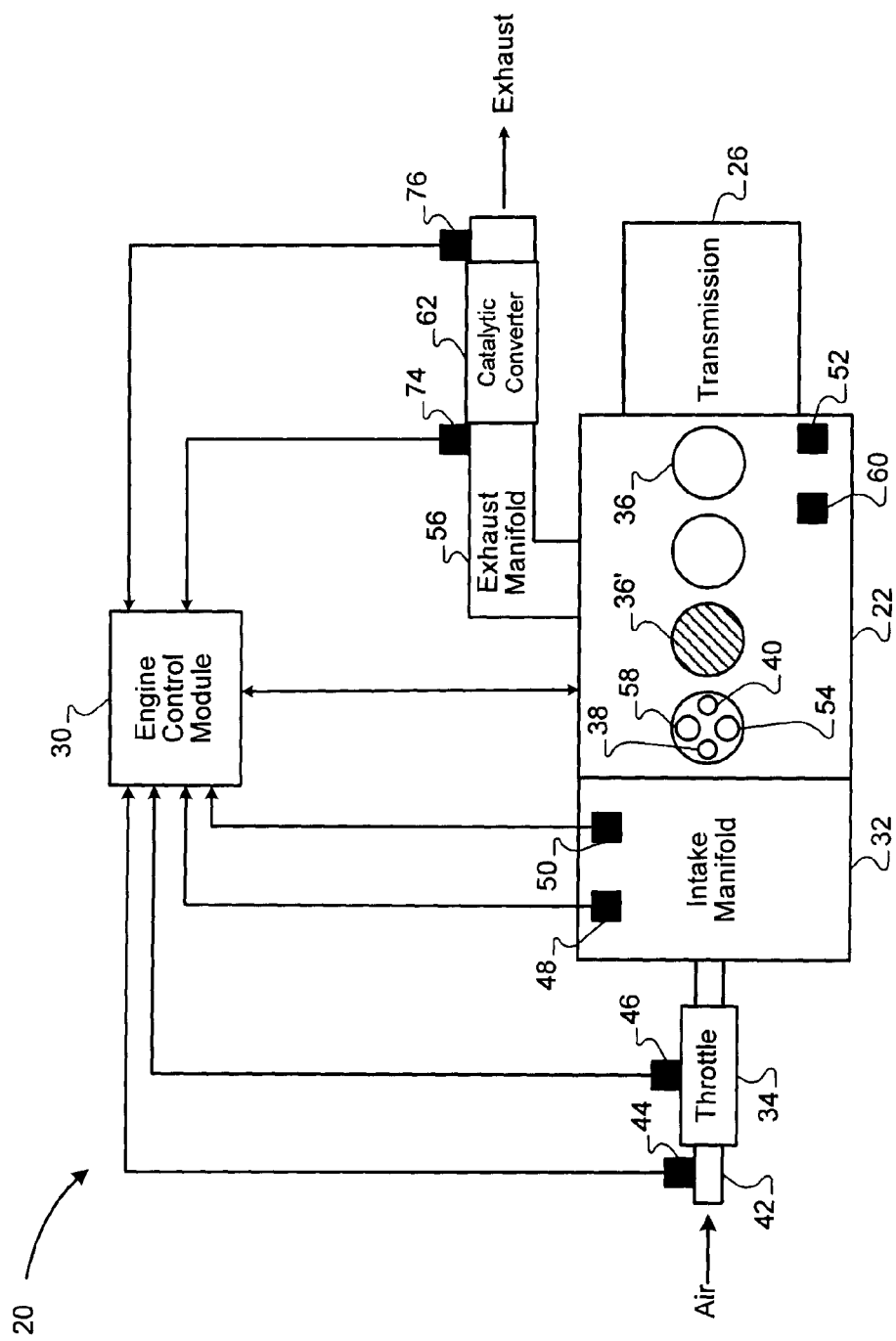
FIG. 1 is a functional block diagram of a vehicle system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Typically, hydrocarbon and carbon monoxide exhaust emissions are high when the internal combustion engine is initially started. At start-up, performance of the catalyst may be increased and exhaust emissions may be reduced by increasing engine speed and retarding spark timing. The combination of increased engine speed and retarded spark timing provides an increased flow of hot exhaust that quickly heats the catalyst to light off temperature. The heated catalyst efficiently controls emissions.

A cold start diagnostic system according to the present disclosure monitors engine speed and spark timing during the cold start. The system determines whether engine speed is properly maintained based on a desired engine speed and a measured engine speed. The system determines whether spark timing is properly maintained based on a commanded spark timing and a desired spark timing. The system may set a fault code if the measured engine speed and/or the commanded spark timing are outside of a predetermined range.

The fault code may include a diagnostic trouble code (DTC). The predetermined range may be based on acceptable emission targets.

Referring now to FIG. 1, an exemplary vehicle system 20 includes a combustion engine 22 that drives a transmission 26. A throttle 34 regulates airflow into an intake manifold 32. Air within the intake manifold 32 is distributed into cylinders 36. An engine control module 30 may deactivate one or more selected cylinders 36' during engine operation. The selected cylinder 36' is deactivated when the engine control module 30 does not actuate a corresponding fuel injector 38 to inject fuel into the selected cylinder 36'. A cylinder 36 is active when the engine control module 30 actuates the corresponding fuel injector 38 to inject fuel into the cylinder 36. Each cylinder 36 may include a spark plug 40 for igniting the air/fuel mixture. Although FIG. 1 depicts four cylinders 36, the engine 22 may include additional or fewer cylinders 36. For example, engines having 5, 6, 8, 10, 12, and 16 cylinders are contemplated. The engine 22 may also provide for an active fuel management system (not shown). While the engine 22 illustrated includes fuel injectors 38 that inject fuel directly into the cylinder 36, engines providing for fuel injection into the intake manifold 32 or an intake port are also contemplated.

The engine control module 30 communicates with components of the vehicle system 20. The components may include the engine 22, sensors, and actuators as discussed herein. The engine control module 30 may implement the cold start diagnostic system of the present disclosure.

Air is passed from an inlet 42 through a mass airflow (MAF) sensor 44, such as a mass airflow meter. The MAF sensor 44 generates a MAF signal that indicates a rate of air flowing through the MAF sensor 44. Inlet air may be metered to the engine 22 via the throttle 34. For example only, the throttle 34 may be a butterfly valve that rotates within the inlet 42. The throttle 34 is actuated based on an engine operating point commanded by an operator and/or a controller. A throttle position sensor (TPS) 46 generates a TPS signal that indicates a position of the throttle 34.

A manifold absolute pressure (MAP) sensor 48 is positioned in the engine intake manifold 32 between the throttle 34 and the engine 22. The MAP sensor 48 generates a MAP signal that indicates manifold absolute air pressure. A manifold air temperature (MAT) sensor 50 located in the intake manifold 32 generates a MAT signal based on intake air temperature.

An engine crankshaft (not shown) rotates at engine speed or a rate that is proportional to the engine speed. A crankshaft sensor 52 senses a position of the crankshaft and generates a crankshaft position (CSP) signal. The CSP signal may depend on the rotational speed of the crankshaft and cylinder events. For example only, the crankshaft sensor 52 may be a variable reluctance sensor. The engine speed and cylinder events may be sensed using other suitable methods.

An intake valve 54 selectively opens and closes to enable air to enter the cylinder 36. An intake camshaft (not shown) regulates intake valve position. A piston (not shown) compresses the air/fuel mixture within the cylinder 36. The engine control module 30 actuates the fuel injector 38 to inject fuel into the cylinder 36. The engine control module 30 may also actuate the spark plug 40 to initiate combustion of the air/fuel mixture, thereby driving the piston in the cylinder 36. The piston drives the crankshaft to produce drive torque. Combustion exhaust within the cylinder 36 is forced out through an exhaust manifold 56 when an exhaust valve 58 is in an open position. An exhaust camshaft (not shown) regulates exhaust valve position. Although single intake and exhaust valves 54, 58 are illustrated, the engine 22 may include multiple intake and exhaust valves 54, 58 per cylinder 36.

The engine 22 may include a cooling system that circulates an engine coolant. The cooling system may include an engine coolant temperature (ECT) sensor 60. The ECT sensor 60 may generate an ECT signal that indicates engine coolant temperature. The ECT sensor 60 may be located within the engine 22 or at other locations where the engine coolant is circulated, such as a radiator (not shown).

A catalytic converter 62 may treat exhaust gases generated by combustion. The vehicle system 20 may include inlet and outlet oxygen sensors 74, 76 that generate oxygen level signals indicative of oxygen levels in the exhaust gases. The engine control module 30 may determine the efficiency of the catalytic converter 62 based on the oxygen level signals.

Figure 2:
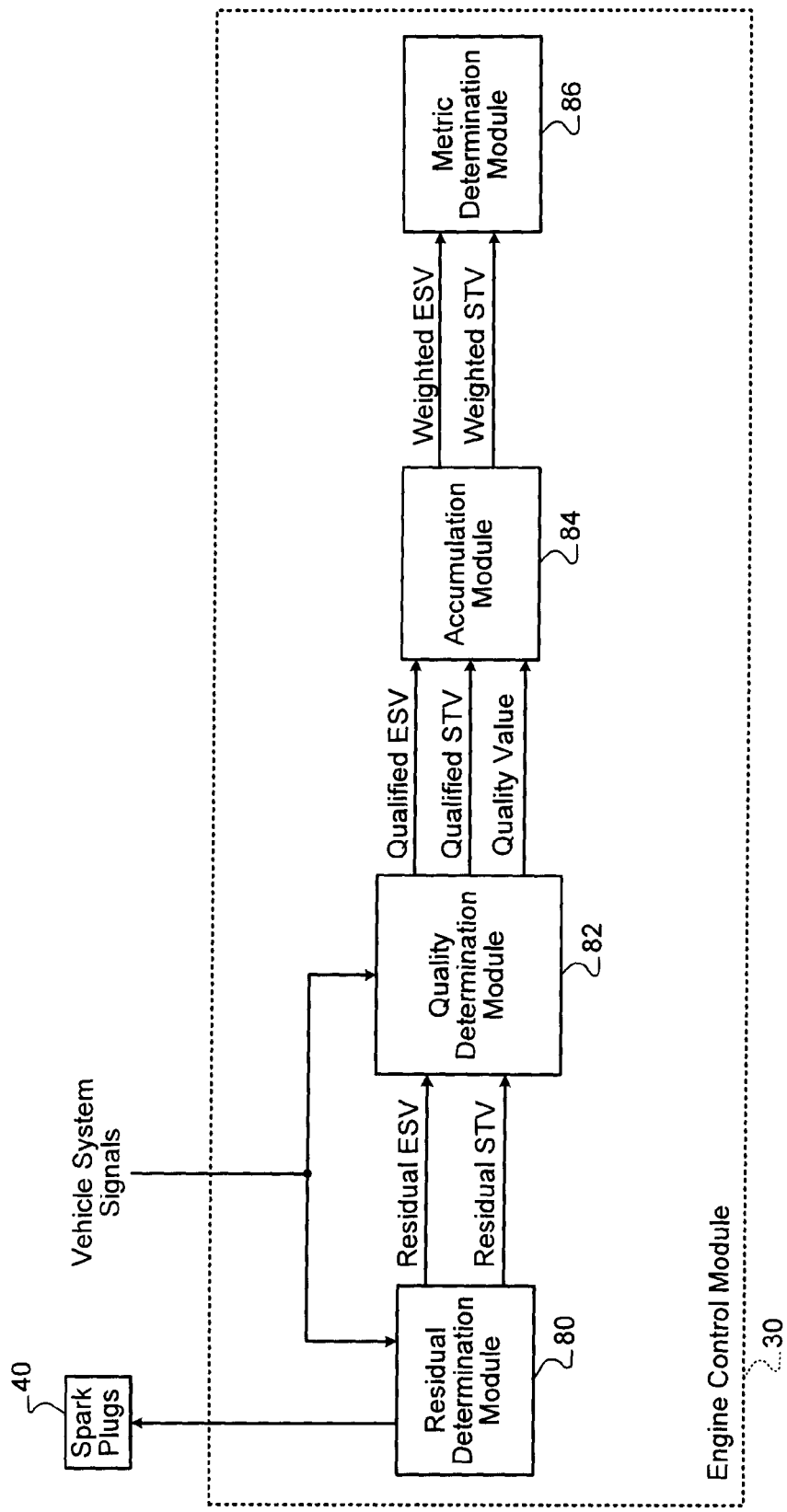
FIG. 2 is a functional block diagram of an engine control module according to the present disclosure.

Referring now to FIG. 2, the engine control module 30 includes a residual determination module 80, a quality determination module 82, an accumulation module 84, and a metric determination module 86. The engine control module 30 receives input signals from the vehicle system 20. The input signals include the MAF, TPS, MAP, MAT, CSP, ECT, and oxygen level signals. The input signals are hereinafter referred to as "vehicle system signals." The engine control module 30 processes the vehicle system signals and generates timed engine control commands that are output to the vehicle system 20. For example, engine control commands may actuate the throttle 34, the fuel injectors 38, and the spark plugs 40.

The engine control module 30 controls the spark timing and the engine speed during the cold start to quickly heat the catalyst. The engine control module 30 may retard the spark timing during the cold start to increase exhaust temperature. The engine control module 30 may also elevate the engine speed during the cold start to increase the flow of exhaust. The increased flow of exhaust at high temperature quickly heats the catalyst, which results in reduced emissions during the cold start.

More specifically, the cold start diagnostic system monitors the engine speed and the spark timing to determine whether the engine speed and the spark timing are properly maintained during the cold start. The elevated engine speed targeted during the cold start may be called a desired engine speed value (desired ESV). The retarded spark timing targeted during the cold start may be called a desired spark timing value (desired STV). Hereinafter, the desired ESV and the desired STV are collectively called "desired values." The cold start diagnostic system determines whether the engine speed is properly maintained during the cold start based on the desired ESV and the measured engine speed. The system determines whether the spark timing is properly maintained during the cold start based on the desired STV and the commanded spark timing. The system may set a DTC to indicate that the engine speed and/or the spark timing is not properly maintained.

The cold start diagnostic system includes determining a residual ESV based on the desired ESV and the measured engine speed. The diagnostic also includes determining a residual STV based on the desired STV and the commanded spark timing. Hereinafter, the residual ESV and the residual STV are collectively called "residual values." The residual values are qualified, cumulated, and averaged to determine a weighted ESV and a weighted STV. The diagnostic determines that the engine speed and the spark timing are properly maintained during the cold start if the weighted ESV and the weighted STV are within predetermined threshold metrics.

The residual determination module 80 determines the residual ESV based on the measured engine speed and the desired ESV. The residual determination module 80 may include an engine speed module (not shown) that determines the desired ESV based on an engine run time and the ETC signals. The engine run time may be the period of time the engine is in operation after the cold start. The residual determination module 80 determines the measured engine speed based on the CSP signals. The residual determination module 80 may determine the residual ESV based on the difference between the desired ESV and the measured engine speed. The residual determination module 80 outputs the residual ESV to the quality determination module 82.

Additionally, the residual determination module 80 determines the residual STV based on the desired STV and the commanded spark timing. The residual determination module 80 determines the desired STV based on the desired ESV and a measured air-per-cylinder (APC) value. The APC value may be based on vehicle system signals, including the MAF, MAP, and MAT signals. The residual determination module 80 may include a spark control module (not shown) that actuates the spark plugs 40 based on the commanded spark timing. The commanded spark timing may be based on the retarded spark timing used during the cold start to increase exhaust temperature. The residual determination module 80 may determine the residual STV based on the difference between the desired STV and the commanded spark timing. The residual determination module 80 outputs the residual STV to the quality determination module 82.

The quality determination module 82 determines a quality value. The quality value may be a number based on operation of the vehicle system 20. A high quality value corresponds to the vehicle system 20 operating in an idle state just following the cold start. A low quality value corresponds to the vehicle system 20 operating further from the idle state. For example only, the quality value may be a number ranging from 0 to 1. A 0 may represent the low quality value and a 1 may represent the high quality value.

The quality value may be based on engine speed, engine load, engine temperature, and engine run time. The quality value may also be based on the position of the throttle 34 and a position of the clutch (not shown). For example only, a quality value of 1 may be associated with a vehicle speed less than 3 kilometers per hour and engine run times that exceed 1-2 seconds after the cold start. The quality value may be used to weight the residual values based on a multiplication of the quality value and the residual value.

More specifically, the quality determination module 82 determines the quality value for each residual ESV and for each residual STV. The quality determination module 82 may determine the quality value based on the CSP signals, the ECT signals, and the engine run time after the cold start. The quality determination module 82 determines a qualified ESV based on the residual ESV and the quality value. The quality determination module 82 may determine the qualified ESV based on multiplication of the residual ESV and the quality value. The quality value used to determine the qualified ESV may be called a corresponding engine quality value. The quality determination module 82 outputs the qualified ESV and the corresponding engine quality value to the accumulation module 84.

Additionally, the quality determination module 82 determines a qualified STV based on the residual STV and the quality value. The quality determination module 82 may determine the qualified STV based on the multiplication of the residual STV and the quality value. The quality value used to determine the qualified STV may be called a corresponding spark quality value. The quality determination module 82 outputs the qualified STV and the corresponding spark quality value to the accumulation module 84.

The accumulation module 84 receives a plurality of the qualified ESVs and a plurality of the corresponding engine quality values. The accumulation module 84 sums the plurality of the qualified ESVs to determine an engine speed sum. The accumulation module 84 sums the plurality of the corresponding engine quality values to determine an engine quality sum. The accumulation module 84 may sum the plurality of the qualified ESVs and the plurality of the corresponding engine quality values for a predetermined number of iterations. For example only, the predetermined number of iterations may include 120 iterations. The accumulation module 84 determines an average ESV based on the engine speed sum and the engine quality sum. The average ESV may be determined by dividing the engine speed sum by the engine quality sum.

Additionally, the accumulation module 84 receives a plurality of the qualified STVs and a plurality of the corresponding spark quality values. The accumulation module 84 sums the plurality of the qualified STVs to determine a spark timing sum. The accumulation module 84 sums the plurality of the corresponding spark quality values to determine a spark quality sum. The accumulation module 84 may sum the plurality of the qualified STVs and the plurality of the corresponding spark quality values for a predetermined number of iterations. For example only, the predetermined number of iterations may include 120 iterations. The accumulation module 84 determines an average STV based on the spark timing sum and the spark quality sum. The average STV may be determined by dividing the spark timing sum by the spark quality sum. The average ESV and the average STV may collectively be called "average values."

The accumulation module 84 determines the weighted ESV based on a plurality of the average ESVs. The accumulation module 84 determines the weighted STV based on a plurality of the average STVs. The weighted ESV and the weighted STV may collectively be called "weighted values." The accumulation module 84 may determine the weighted values based on a moving average. The moving average may be an exponentially weighted moving average. The accumulation module 84 may determine the exponentially weighted moving average based on the time at which the average values are received. For example only, older average values may be weighted more than recent average values. Alternatively, other methods of determining the moving average may be used. The accumulation module 84 outputs the weighted ESV and the weighted STV to the metric determination module 86.

The metric determination module 86 includes a predetermined engine speed metric. The predetermined engine speed metric includes a minimum threshold value and a maximum threshold value. The metric determination module 86 determines whether the weighted ESV is within the predetermined engine speed metric. The metric determination module 86 may set an engine speed DTC if the weighted ESV is not within the predetermined engine speed metric. The engine speed DTC may indicate that the engine speed was not maintained properly during the cold start.

Additionally, the metric determination module 86 includes a predetermined spark timing metric. The predetermined spark timing metric includes a minimum threshold value and a maximum threshold value. The metric determination module 86 determines whether the weighted STV is within the predetermined spark timing metric. The metric determination module 86 may set a spark timing DTC if the weighted STV is not within the predetermined spark timing metric. The spark timing DTC may indicate that the retarded spark timing was not maintained properly during the cold start.

Figure 3:
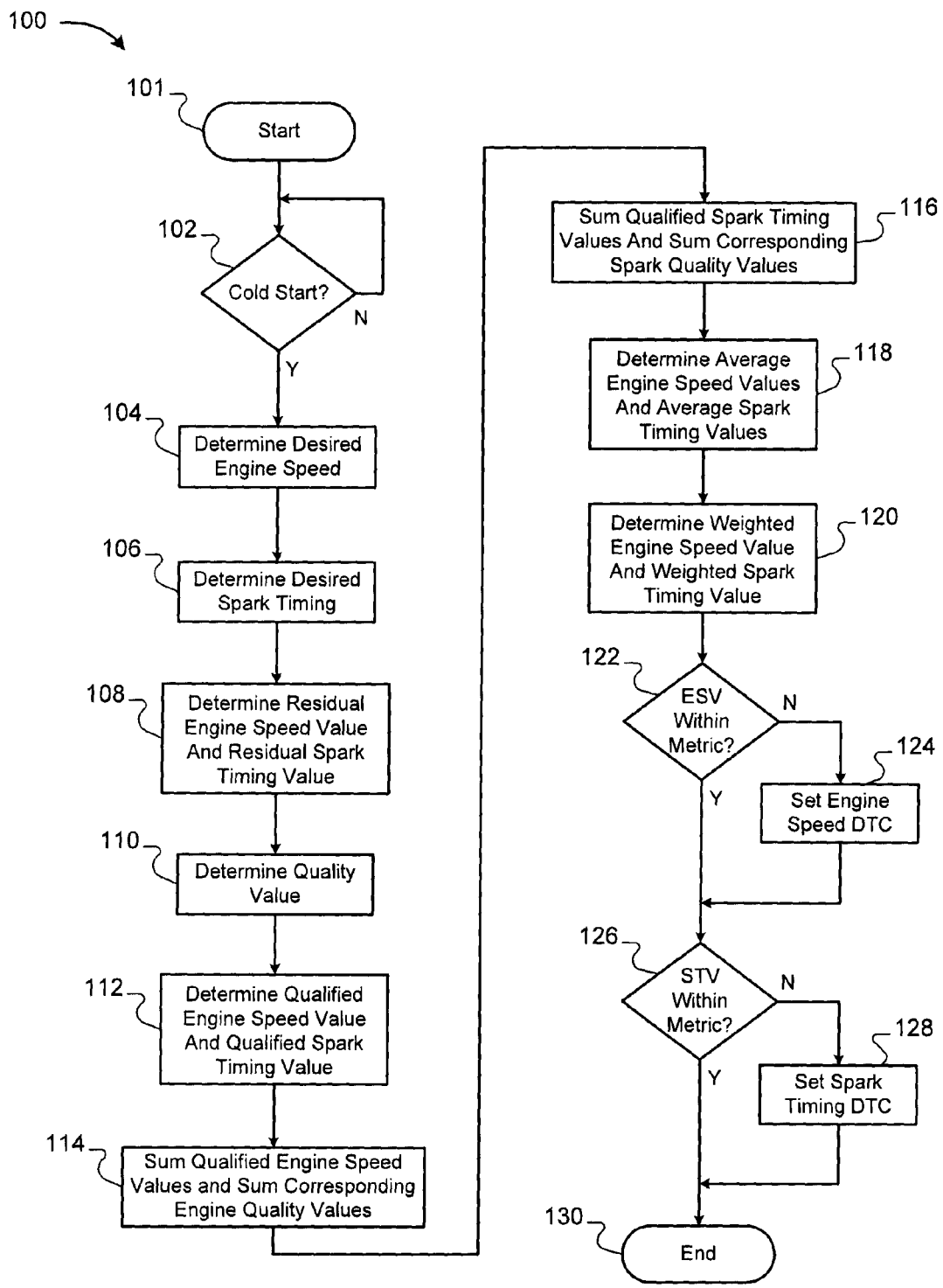
FIG. 3 is a flow diagram that illustrates the steps of a method for diagnosing a cold start according to the present disclosure.

Referring now to FIG. 3, a method 100 for diagnosing a cold start begins in step 101. In step 102, the residual determination module 80 determines whether the cold start has occurred. If true, the method 100 continues to step 104. If false, the method 100 repeats step 102. In step 104, the residual determination module 80 determines the desired ESV. In step 106, the residual determination module 80 determines the desired STV. In step 108, the residual determination module 80 determines the residual ESV and the residual STV.

In step 110, the quality determination module 82 determines the quality value. In step 112, the quality determination module 82 determines the qualified ESV and the qualified STV. In step 114, the accumulation module 84 sums the qualified ESVs and sums the corresponding engine quality values. In step 116, the accumulation module 84 sums the qualified STVs and sums the corresponding spark quality values. In step 118, the accumulation module 84 determines average ESVs and average STVs. In step 120, the accumulation module 84 determines the weighted ESV and the weighted STV.

In step 122, the metric determination module 86 determines whether the weighted ESV is within the predetermined engine speed metric. If false, the method 100 continues to step 124. If true, the method 100 continues to step 126. In step 124, the metric determination module 86 sets the engine speed DTC. In step 126, the metric determination module 86 determines whether the weighted STV is within the predetermined spark timing metric. If false, the method 100 continues to step 128. If true, the method 100 continues to step 130. In step 128, the metric determination module 86 sets a spark timing DTC. The method 100 ends in step 130.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An engine control module comprising:
   a spark control module that actuates spark plugs based on a commanded spark timing;
   an engine speed module that determines a desired engine speed based on an engine temperature and a period of time an engine is in operation after a cold start;
   a residual determination module that determines a desired spark timing based on said desired engine speed, and that determines a residual spark timing based on a difference between said commanded spark timing and said desired spark timing; and
   a metric determination module that detects a spark timing fault based on said residual spark timing and a predetermined spark timing range.

2. The engine control module of claim 1 wherein said commanded spark timing is based on a retarded spark timing used during the cold start to increase exhaust temperature.

3. The engine control module of claim 1 wherein said residual determination module determines said desired spark timing based on a measured air-per-cylinder value.

4. The engine control module of claim 1 wherein said residual determination module determines a residual engine speed based on a difference between a measured engine speed and said desired engine speed.

5. The engine control module of claim 4 wherein said metric determination module detects an engine speed fault based on said residual engine speed and a predetermined engine speed range.

6. The engine control module of claim 1 further comprising a quality determination module that determines a quality value based on at least one of a measured engine speed, said engine temperature, and said period of time, wherein said quality value indicates performance of a vehicle system relative to an idle state.

7. The engine control module of claim 6 wherein said metric determination module detects said spark timing fault based on said quality value.

8. The engine control module of claim 7 wherein said metric determination module detects said spark timing fault based on a plurality of said quality values, a plurality of said residual spark timings, and said predetermined spark timing range.

9. The engine control module of claim 6 wherein said metric determination module detects an engine speed fault based on said quality value, said desired engine speed, said measured engine speed, and a predetermined engine speed range.

10. The engine control module of claim 9 wherein said metric determination module detects said engine speed fault based on a plurality of said quality values, a plurality of said desired engine speeds, a plurality of said measured engine speeds, and said predetermined engine speed range.

11. A method comprising:
    actuating spark plugs based on a commanded spark timing;
    determining a desired engine speed based on an engine temperature and a period of time an engine is in operation after a cold start;
    determining a desired spark timing based on said desired engine speed;
    determining a residual spark timing based on a difference between said commanded spark timing and said desired spark timing; and
    detecting a spark timing fault based on said residual spark timing and a predetermined spark timing range.

12. The method of claim 11 further comprising determining said commanded spark timing based on a retarded spark timing used during the cold start to increase exhaust temperature.

13. The method of claim 11 further comprising determining said desired spark timing based on a measured air-per-cylinder value.

14. The method of claim 11 further comprising determining a residual engine speed based on a difference between a measured engine speed and said desired engine speed.

15. The method of claim 14 further comprising detecting an engine speed fault based on said residual engine speed and a predetermined engine speed range.

16. The method of claim 11 further comprising determining a quality value based on at least one of a measured engine speed, said engine temperature, and said period of time, wherein said quality value indicates performance of a vehicle system relative to an idle state.

17. The method of claim 16 further comprising detecting said spark timing fault based on said quality value.

18. The method of claim 17 further comprising detecting said spark timing fault based on a plurality of said quality values, a plurality of said residual spark timings, and said predetermined spark timing range.

19. The method of claim 16 further comprising detecting an engine speed fault based on said quality value, said desired engine speed, said measured engine speed, and a predetermined engine speed range.

20. The method of claim 19 further comprising detecting said engine speed fault based on a plurality of said quality values, a plurality of said desired engine speeds, a plurality of said measured engine speeds, and said predetermined engine speed range.

* * * * *